US009699060B2

United States Patent
Singaravelu et al.

(10) Patent No.: US 9,699,060 B2
(45) Date of Patent: Jul. 4, 2017

(54) SPECIALIZING VIRTUAL NETWORK DEVICE PROCESSING TO AVOID INTERRUPT PROCESSING FOR HIGH PACKET RATE APPLICATIONS

(71) Applicant: VMware, Inc., Palo Alto, CA (US)

(72) Inventors: Lenin Singaravelu, Sunnyvale, CA (US); Jin Heo, Mountain View, CA (US); Jui-Ting Weng, Sunnyvale, CA (US); Ayyappan Veeraiyan, Cupertino, CA (US); Yong Wang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 233 days.

(21) Appl. No.: 14/574,354

(22) Filed: Dec. 17, 2014

(65) Prior Publication Data

US 2016/0182342 A1  Jun. 23, 2016

(51) Int. Cl.
  *H04L 12/26* (2006.01)
  *H04L 12/841* (2013.01)
  *G06F 9/455* (2006.01)

(52) U.S. Cl.
  CPC .......... *H04L 43/16* (2013.01); *G06F 9/45558* (2013.01); *H04L 43/0894* (2013.01); *H04L 43/103* (2013.01); *G06F 2009/45595* (2013.01); *H04L 47/28* (2013.01)

(58) Field of Classification Search
  CPC ....... G06F 2009/45595; G06F 9/45558; H04L 43/0894; H04L 43/103; H04L 43/16; H04L 47/29
  USPC .......................................... 370/253; 709/250
  See application file for complete search history.

(56) References Cited

U.S. PATENT DOCUMENTS

| 6,735,629 | B1 * | 5/2004 | Cafarelli, III | H04L 43/12 709/223 |
| 7,843,906 | B1 * | 11/2010 | Chidambaram | H04L 47/6205 370/386 |
| 7,990,994 | B1 * | 8/2011 | Yeh | H04L 12/4641 370/431 |
| 8,086,739 | B2 * | 12/2011 | Tripathi | H04L 12/2602 370/229 |

(Continued)

OTHER PUBLICATIONS

Luo et al., "Accelerated Virtual Switching with Programmable NICs for Scalable Data Center Networking," VISA 2010, Sep. 3, 2010, New Delhi, India.*
"Best Practices for Performance Tuning of Latency-Sensitive Workloads in vSphere VMs," Techical White Paper, VMWare, 2013.*

*Primary Examiner* — Alina N Boutah

(57) ABSTRACT

A method of high packet rate network processing in a system that includes a physical host and a set of physical network interface controllers (PNICs). The physical host is hosting a set of data compute nodes (DCNs). Each DCN includes a virtual network interface controller (VNIC) for communicating with one or more PNICs to exchange packets. The method determines that a rate of packets received from a particular DCN at the VNIC of the particular DCN exceeds a predetermined threshold. The method performs polling to determine the availability of packets received at the VNIC from the particular DCN while the rate of packets received from the DCN at the VNIC is exceeding the threshold. The method utilizes interrupts to determine the availability of packets received at the VNIC from the particular DCN while the rate of packets received from the DCN at the VNIC does not exceed the threshold.

21 Claims, 16 Drawing Sheets

(56) References Cited

U.S. PATENT DOCUMENTS

| | | | | |
|---|---|---|---|---|
| 8,102,852 B2* | 1/2012 | Marcondes | | H04L 43/026 370/229 |
| 8,341,505 B2* | 12/2012 | Tripathi | | G06F 9/45558 714/779 |
| 2008/0002714 A1* | 1/2008 | Belgaied | | H04L 47/10 370/395.21 |
| 2008/0005441 A1* | 1/2008 | Droux | | H04L 49/10 710/306 |
| 2009/0219935 A1* | 9/2009 | Tripathi | | H04L 12/4641 370/392 |
| 2009/0327781 A1* | 12/2009 | Tripathi | | G06F 9/4818 713/324 |
| 2012/0151472 A1* | 6/2012 | Koch | | G06F 9/45558 718/1 |
| 2012/0151473 A1* | 6/2012 | Koch | | G06F 9/45558 718/1 |
| 2015/0055499 A1* | 2/2015 | Zheng | | H04L 47/56 370/252 |
| 2016/0092259 A1* | 3/2016 | Mehta | | G06F 9/45558 718/1 |
| 2016/0094661 A1* | 3/2016 | Jain | | H04L 41/0803 709/227 |
| 2016/0142314 A1* | 5/2016 | Parsa | | H04L 45/7453 370/235 |
| 2016/0156591 A1* | 6/2016 | Zhou | | H04L 63/0227 726/13 |
| 2016/0173379 A1* | 6/2016 | Heo | | H04L 45/745 370/392 |

* cited by examiner

SPECIALIZING VIRTUAL NETWORK DEVICE PROCESSING TO AVOID INTERRUPT PROCESSING FOR HIGH PACKET RATE APPLICATIONS

BACKGROUND

Virtualization of network devices provides many advantages in virtualized environments. It allows for sharing a single physical device amongst multiple virtual machines, setting resource limits (e.g., CPU for processing, packet rate and throughput limits for isolation), packet inspection, migration of virtual machines, and enables many features such as fault-tolerance and high availability. However, virtualization of network devices also adds considerable CPU processing overheads. In some cases, workloads show an overhead of 30% to 200% over a purely non-virtualized implementation. High packet rate applications such as firewalls, routers, and Dynamic Host Configuration Protocol (DHCP) servers require performance in the order of a few million to a few tens of million packets processed per second and the virtual device processing overhead limits performance to a million to a few million packets/sec.

Single Root IO Virtualization (SR-IOV) is a mix of hardware and software solutions to support high performance networking workloads on virtualized environments. SR-IOV allows for capabilities such as device sharing and moving of virtual machines between different hosts on some virtualization platforms. However, SR-IOV requires special hardware and SR-IOV enabled physical network interface controllers (PNICs) and SR-IOV capable drivers. Implementing other virtualization features such as memory overcommit or virtual machine fault-tolerance might require future hardware and software updates while features such as packet inspection might not be possible.

BRIEF SUMMARY

Methods and systems are provided to make packet processing more efficient for virtual network devices. Typically, a virtual machine (VM) is connected to a physical network interface controller (PNIC) through a virtual switch. For instance, the VM is connected to a port on the virtual switch through a virtual network interface controller (VNIC). The PNIC is connected to another port on the virtual switch. The VM sends and receives packets through the PNIC. Some embodiments identify a virtual machine (VM) that consumes all traffic on a single physical network interface controller (PNIC) and is not sharing the PNIC with any other VMs. These embodiments provide a specialization of the virtual device processing that bypasses the virtual switch layer and hook up the virtual device code with the physical code. Since there is a single source port and a single destination port, any traffic an external switch routes to the PNIC reaches the VM and vice versa.

Bypassing the virtual switching layer reduces processing cost per packet by around 5%-10% and increases the packet processing ability accordingly. Bypassing of the virtual switch is a runtime decision. Once a need arises for connecting the VM to the switch (e.g., when another VM is moved to the same host, port mirroring is needed to tap the packets, or any services the VM requires that needs the virtual switch), the VM is switched to use the virtual switch. The VM is transparently switched between a fast path (no switching) and slow path (switching) to provide the required features of virtualization.

Some embodiments identify applications that consistently have high packet rates. These embodiments provide a tradeoff between the processing resources and higher packet rates. These embodiments modify virtual device processing to occur in polling mode rather then interrupt (or sys-call) driven mode. Streamlining virtual device processing provides a two-fold advantage. First, packet processing does not incur any latency. Second, the virtual backend, virtual machine monitor, guest kernel, and guest device driver for the virtual network device do not have to execute interrupt coalescing and interrupt processing code. The processing overhead is reduced by 1%-2%, increasing packet processing by a similar amount. Some embodiments turn on/off the polling mode when a VNIC is initialized (e.g., at the time of VM boot or VNIC reset). In other embodiments, the polling mode is adaptively turned on or off during the runtime. In these embodiments, polling is turned on when packet rate is high and turns off polling when the packet rate is low.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
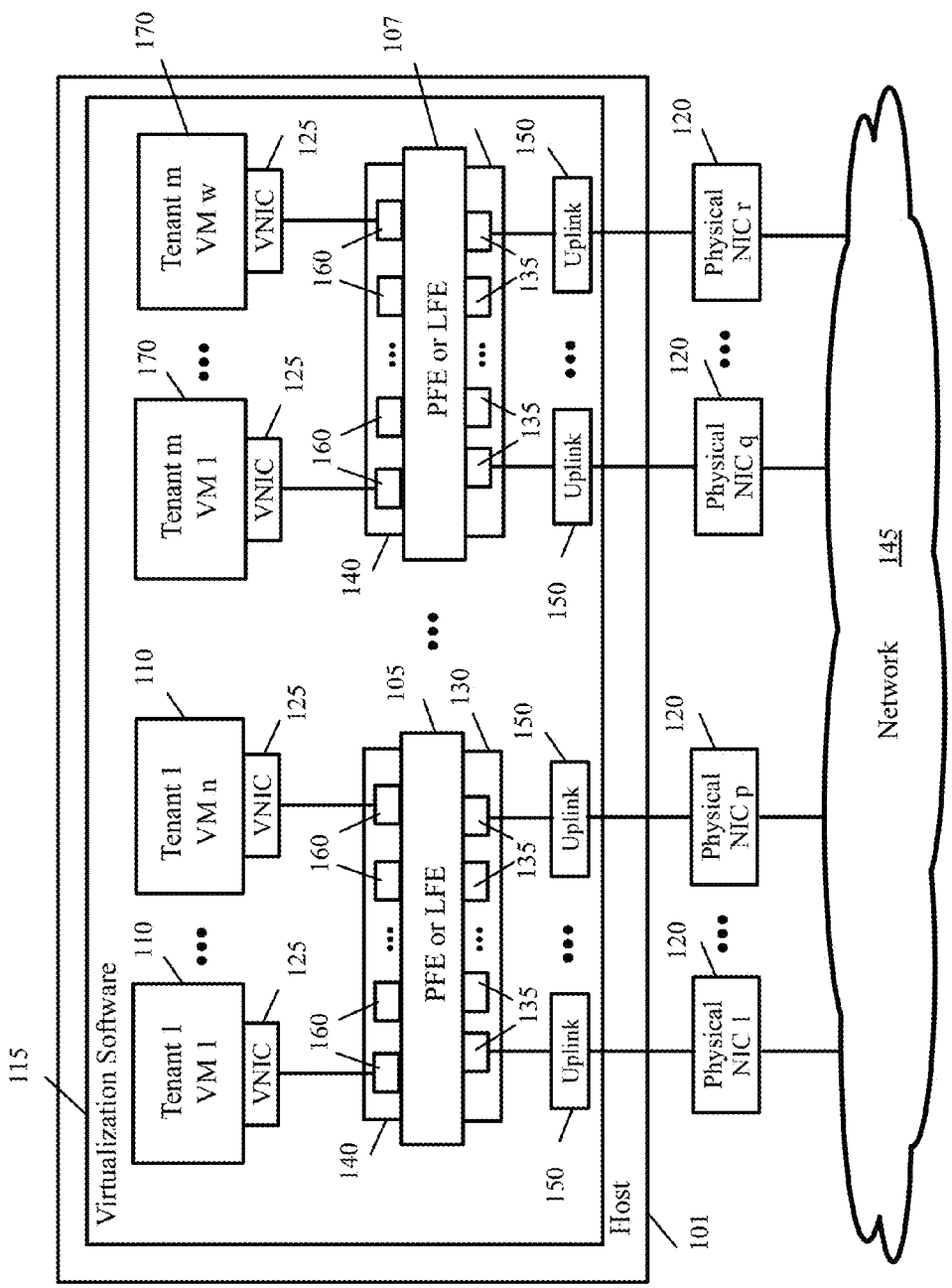
FIG. 1 conceptually illustrates a virtualized infrastructure domain in some embodiments of the invention.

Virtualization is the ability to simulate a hardware platform, such as a server, storage device or network resource, in software. A virtual machine (VM) is a software implementation of a machine such as a computer. FIG. 1 conceptually illustrates a virtualized infrastructure domain in some embodiments of the invention. The virtualized infrastructure domain is in some embodiments a virtualized infrastructure that is managed by a single cloud management system. The virtualized infrastructure domain includes a set of host machines 101, one of which is shown in FIG. 1. Each host can host one or more tenants, each tenant can have one or more VMs 110 and 170. In FIG. 1, VMs 110 belong to one tenant and VMs 170 belong to a different tenant. The host machines also host a set of services that provide different services. The term cloud service refers to services (such as computing, storage, etc.) provided in a distributed manner over a network.

As shown, the host 101 includes virtualization software (sometimes referred to as a hypervisor) 115. The virtualization software 115 is representative of the various types of virtualization software that may operate on hosts in such a virtualized infrastructure (e.g., virtual machine monitor, etc.). In some embodiments, this virtualization software 115 includes one or more forwarding elements 105-107.

The VMs of each tenant form a logical network (also referred to as private network or virtual network). The logical network is identified by a logical network identifier (also known as virtual network identifier or VNI). Each logical network is configured by a tenant. The logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks.

In some embodiments, the forwarding element in the virtualization software is a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. A PFE forwards packets in a physical network whether or not it is implemented in software while a LFE forwards packets in a logical network, which is logically decoupled or abstracted from the physical network. In other words, the software forwarding elements are referred to as PFEs because they exist and operate in the physical world, whereas an LFE is a logical representation of a forwarding element that is presented to a user when designing a logical network.

In some embodiments, several PFEs are distributed throughout the network implement tenant's LFEs, where each PFE is a local instantiation, or a proxy, of an LFE that operate across different host machines and can perform L3 packet forwarding between VMs on the host machine or on different host machines. An LFE is sometimes referred to as a virtual distributed switch (VDS). In the following discussions, the term forwarding element refers to either a PFE or an LFE, depending on a particular configuration.

In each host 101, each forwarding elements 105-107 connects to one or more physical network interface controllers (PNICs) 120 to send outgoing packets and to receive incoming packets through a physical network 145. As shown, each forwarding element 105-107 in FIG. 1 is defined to include one or more ports 135 (or a port group 130) through which it connects to uplinks 150 and the physical NICs 120 to send and receive packets.

Each forwarding element 105-107 is also defined to have a set of virtual ports 160 (or a virtual port group 140) to connect to VMs 110 through virtual NICs (VNICs) 125 to the forwarding element 105. A port group is a group of ports that have the same configuration. An uplink 150 is a module that relays packets between the forwarding element 105 and the physical NIC 120 in order to perform various packet processing functions on incoming and outgoing traffic.

I. Selective Bypassing or Use of Forwarding Elements

Some embodiments identify a VM that consumes all traffic on a single physical network interface controller (PNIC) and is not sharing the PNIC with any other VMs. These embodiments provide a specialization of the virtual device processing that bypasses the virtual switch layer and hook up the virtual device code with the physical code. Since there is a single source port and a single destination port, any traffic an external switch routes to the PNIC reaches the VM and vice versa.

Bypassing the virtual switching layer reduces processing cost per packet by around 5%-10% and increases the packet processing ability accordingly. Bypassing of the virtual switch is a runtime decision. Once a need arises for connecting the VM to the switch (e.g., when another VM is moved to the same host, port mirroring is needed to tap the packets, or any services the VM requires that needs the virtual switch), the VM is switched to use the virtual switch. The VM is transparently switched between a fast path (no switching) and slow path (switching) to provide the required features of virtualization.

A. Criteria to Use or Bypass the Forwarding Element

Figure 2:
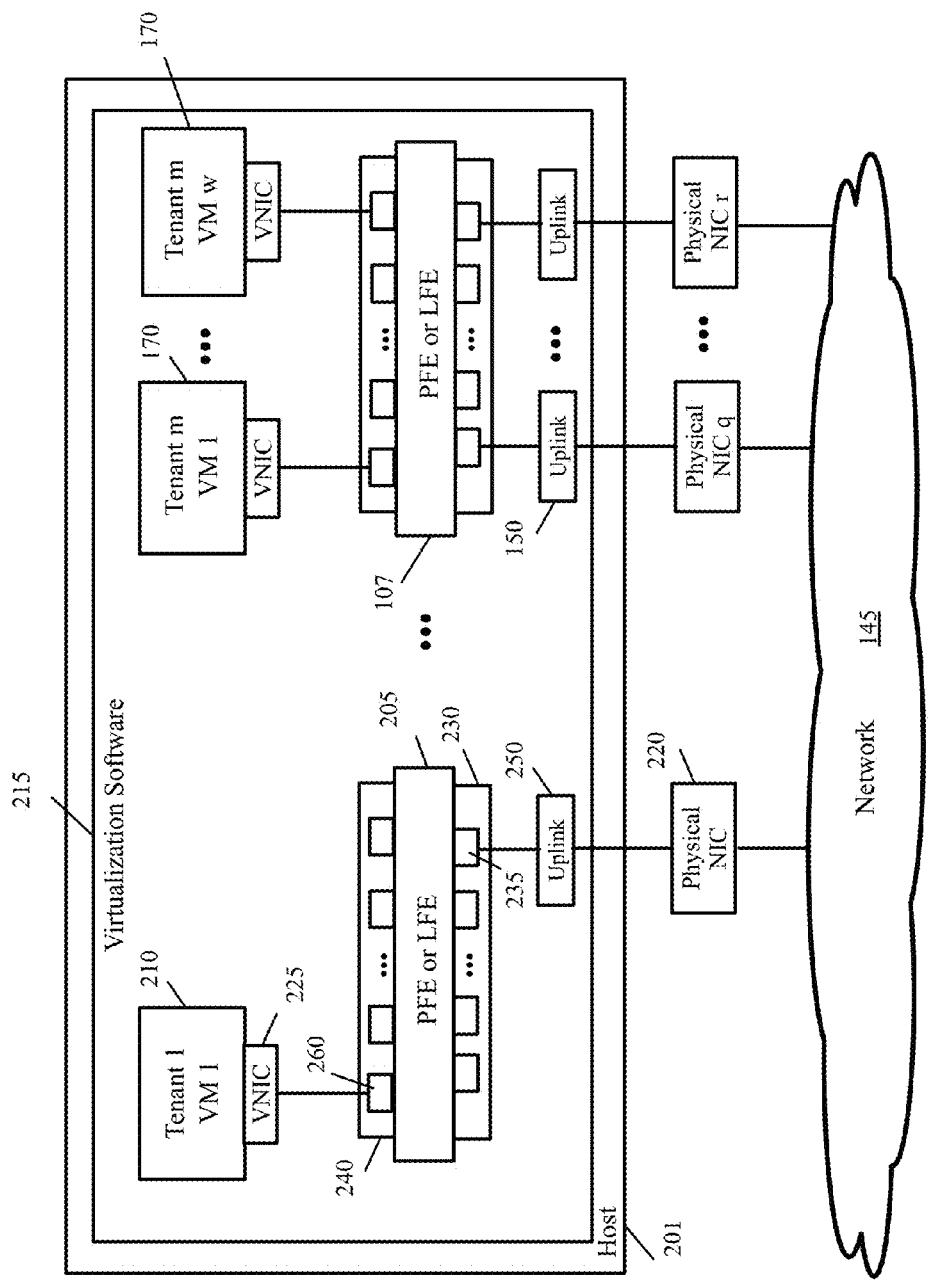
FIG. 2 conceptually illustrates a forwarding element that is only connected to one VM and one physical NIC.

FIG. 2 conceptually illustrates a forwarding element that is only connected to one VM and one physical NIC. As shown, VM 210 is connected to the forwarding element 205 through VNIC 225 and port 260. PNIC 220 is connected to the forwarding element 205 through the uplink 250 and port 235 of port group 230. Utilizing the forwarding element 205 to exchange packets between VM 210 and PNIC 220 create extra processing overhead.

Some embodiment, dynamically identify the conditions where the forwarding element can be bypassed in the connection between a VM and a PNIC. These conditions include that only two ports of the switch are connected: a port connected to a VM (through a VNIC) and a port connected to an uplink. Another condition is that port mirroring/packet forwarding is not enabled for the switch. When port mirroring is enabled for a forwarding element, a copy of each packet passing through a port is sent to another port (a port different than the port PNIC is connected to) to monitor the packet traffic (e.g., to detect intrusion, to do performance monitoring, etc.). Under the above-mentioned conditions, the VM sends and receives packets through only one PNIC and there is no need for port mirroring. As shown in FIG. 2, VM 210 and PNIC 220 are the only entities connected to the forwarding element's ports.

Figure 3:
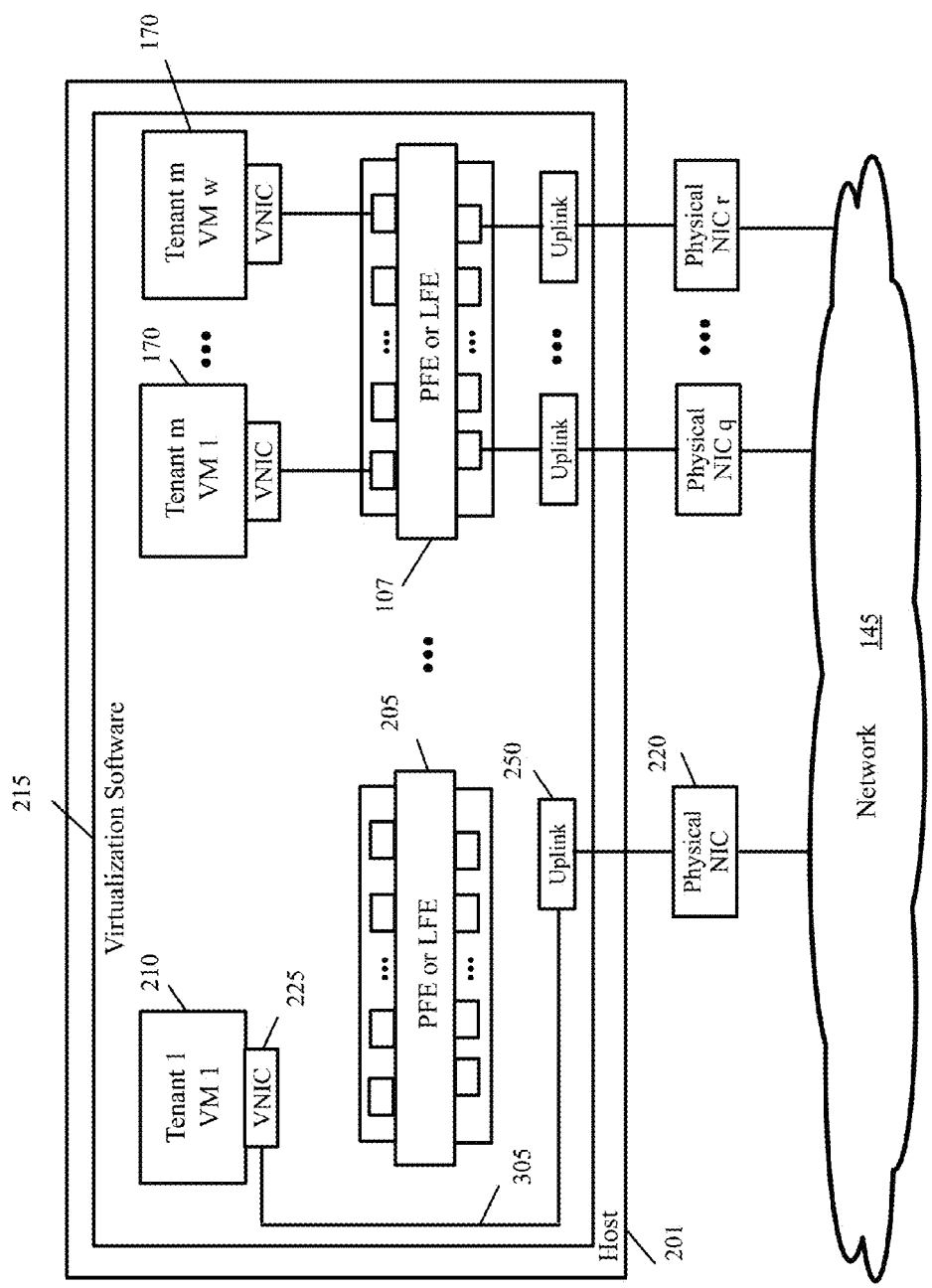
FIG. 3 conceptually illustrates the VM of FIG. 2 after the forwarding element is bypassed in some embodiments of the invention.

FIG. 3 conceptually illustrates the VM of FIG. 2 after the forwarding element is bypassed in some embodiments of the invention. As shown, there are no forwarding elements in the path between VM 210 and PNIC 220 and a direct path (as conceptually shown by the line 305) is provided between the VNIC 225 and the uplink 250 to exchange packets between the VM 210 and the PNIC 220. The decision to bypass the forwarding element is dynamically made during runtime when a set of conditions is met. Once the use of a forwarding element is required again, the packet exchange between the VM is the PNIC is once again performed through the forwarding element 205.

Different embodiments provide different mechanisms for bypassing the forwarding element. Since the forwarding element 205 is implemented in software, some embodiments provide a fast path through the forwarding element software to bypass the functionality of the forwarding element. The following pseudo code illustrates bypassing of the forwarding element functionality in some embodiments of the invention.

```
if all conditions for bypassing the forwarding element are satisfied
        fastpath = TRUE
else
        fastpath = FALSE
/*** Perform forwarding element functionalities ***/
switching ( )
        if fastpath then
                return
        else
        {
                /* perform forwarding element
                functionalities */
        }
```

In some embodiments, each time a VNIC is connected to a port, a callback is generated to the virtualization software. Similarly, when a PNIC is connected to a port through an uplink, a callback is generated to the virtualization software. The virtualization software is therefore able to determine the number of VNICs and PNICs that are connected to a forwarding element at each time.

Some embodiments bypass the forwarding element by providing a direct software link between the uplink and the VNIC driver for the duration that the forwarding element is bypassed. In either case, only the forwarding element is bypassed in order to eliminate unnecessary processing for the forwarding element while the virtualization software is still aware of the interactions between the VM and other components of the system and is capable of dynamically connecting the VM to the PNIC through the forwarding element once the need arises for the use of the forwarding element during the runtime.

From a security perspective, bypassing the forwarding element in combination with a vulnerability in the physical/upstream infrastructure can allow the VM to receive packets from any other VMs. For a proper defense in depth implementation, some embodiments ensure that the VM port has proper security credentials before allowing bypass. As an additional condition for allowing the bypassing of the forwarding element, these embodiments determine whether the port that connects the VM to the forwarding element can send packets to arbitrary media access control (MAC) addresses and can receive packets with arbitrary destination MAC addresses (promiscuous mode). Such a condition is not very limiting as the forwarding element bypass is targeted towards high packet rate applications and many such applications are gateway/edge applications and are able to receive and send arbitrary MAC address packets.

Figure 4A:
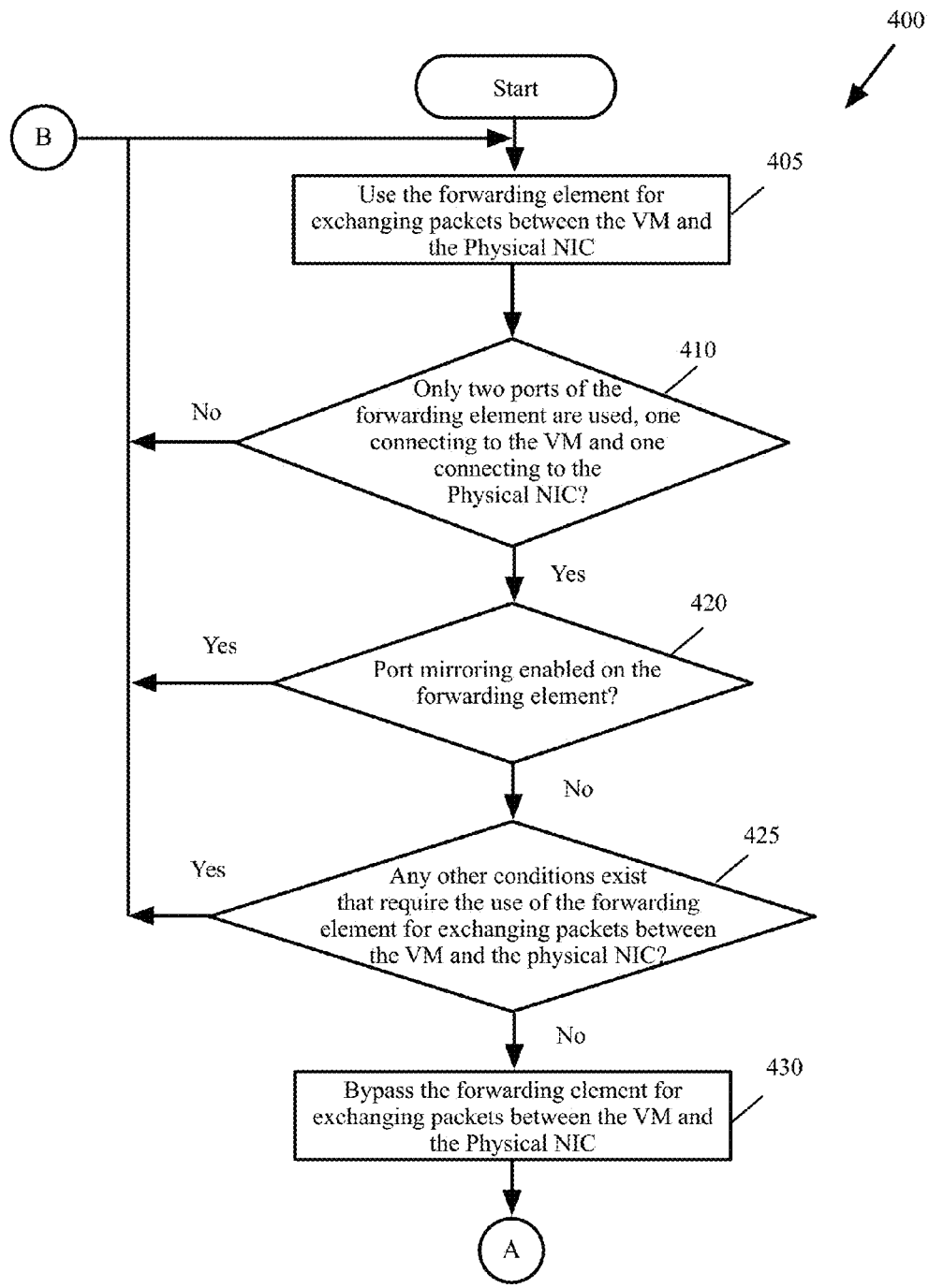
FIGS. 4A and 4B conceptually illustrate a process for determining whether a forwarding element can be bypassed in the path between a VM and a physical NIC in some embodiments of the invention.
Figure 4B:
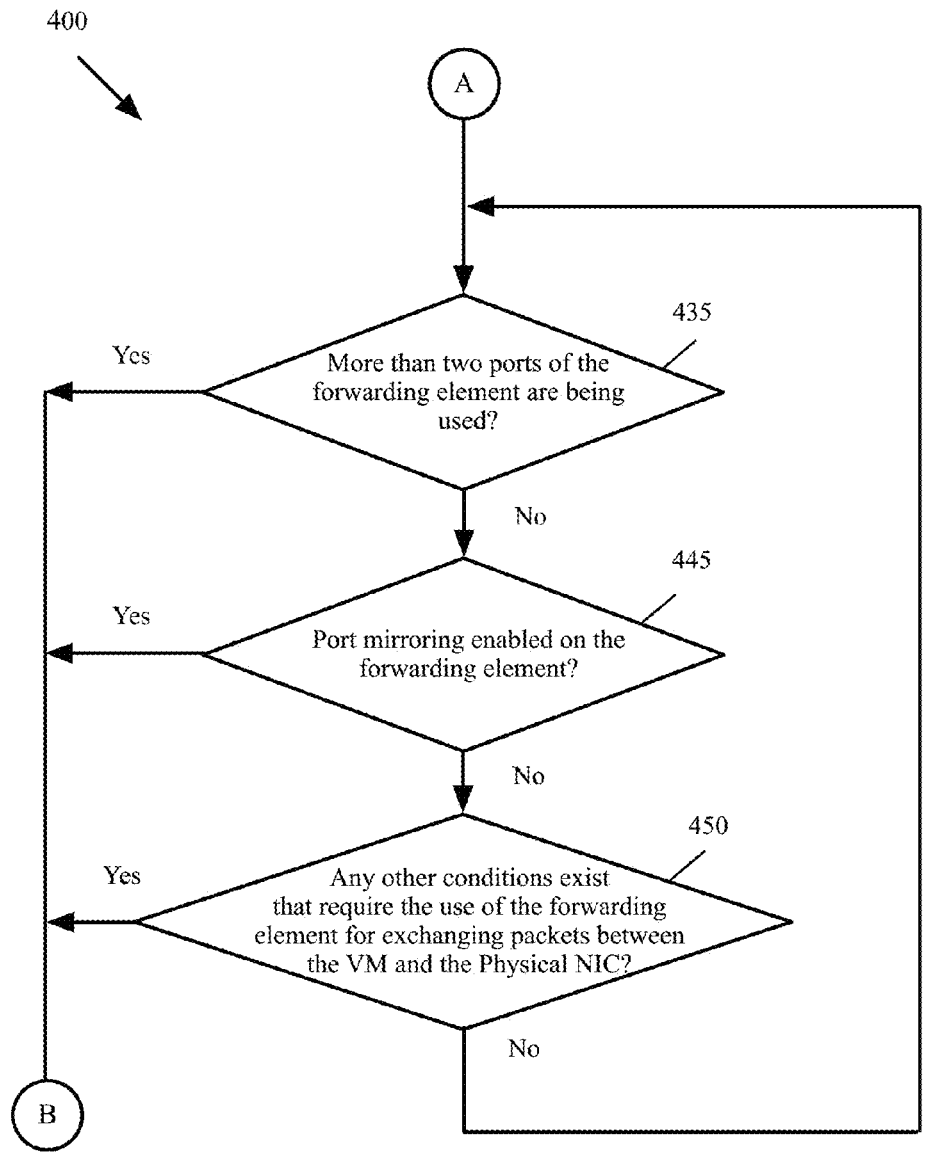

FIGS. 4A and 4B conceptually illustrate a process 400 for determining whether a forwarding element can be bypassed in the path between a VM and a physical NIC in some embodiments of the invention. As shown, the process initially uses (at 405) a forwarding element for exchanging packets between the VM and the physical NIC. The process then determines (at 410) whether only two ports of the forwarding elements are used, one port connecting to the VM (e.g., through a VNIC) and one port connecting to the physical NIC (e.g., through an uplink) If not, the process proceeds (e.g., after some predetermined delay) to 405, which was described above. For instance, more than two ports are used when the VM is required to be connected to more than one physical NIC or any other VMs are connected to the forwarding element.

Otherwise, the process determines (at 420) whether port mirroring is enabled on the forwarding element. If yes, the process proceeds (e.g., after some predetermined delay) to 405, which was described above. Otherwise, the process determines (at 425) whether there are any other conditions that require the use of the forwarding element for exchanging packets between the VM and the PNIC. For instance, some embodiments determine whether the port connected to the VM has proper security credentials before allowing the bypass (e.g., whether the port can send arbitrary MAC address packets and can receive arbitrary MAC address packets, i.e., to operate in promiscuous mode).

Another condition for bypassing a forwarding element is the network virtualization (e.g., tunnels for overlay networks such as Virtual eXtensible LAN (VXLAN), Generic Network Virtualization Encapsulation (GENEVE), Network Virtualization using Generic Routing Encapsulation (NVGRE), and stateless transport tunneling (STT)) is not performed by the forwarding element. In other words, the forwarding element is not a part of a software-defined network. In some embodiments, the forwarding element encapsulates the outgoing packets and decapsulates the incoming packets. In such cases, the forwarding element cannot be bypassed due to the required encapsulation/decapsulation functionality of the forwarding element. In some embodiments, the encapsulation and decapsulation of packets for such tunnels is done outside of a forwarding element.

Therefore, the condition that the forwarding element does not encapsulate and decapsulate packets is satisfied either when the encapsulation and decapsulation of packets is done outside the forwarding element or the forwarding element is capable of encapsulating and decapsulating the packets but such encapsulation and decapsulation is not enabled (e.g., the overlay network tunnels are not used by the VM that is connected to the forwarding element). If there are any other conditions that require the use of the forwarding element, the process proceeds (e.g., after some predetermined delay) to 405, which was described above. Otherwise, the process bypasses (at 430) the forwarding element for exchanging packets between the VM and the physical NIC.

The process then dynamically determines whether the conditions have changed and the forwarding element can no longer be bypassed. The process determines (at 435) whether more than two ports of the forwarding element are being used. For instance, VM is required to be connected to more than one physical NIC or any other VMs are connected to the forwarding element. If yes, the process proceeds back to 405 to use the forwarding element for exchanging the packets between the VM and the physical NIC.

Otherwise, the process determines (at 445) whether port mirroring is enabled on the forwarding element. If yes, the process proceeds back to 405 to use the forwarding element for exchanging the packets between the VM and the physical NIC. Otherwise, the process determines (at 450) whether any other conditions (as described above by reference to operation 425) exist that require the use of forwarding element for exchanging packets between the VM and the PNIC. If yes, the process proceeds back to 405 to use the forwarding element for exchanging the packets between the VM and the physical NIC. Otherwise, the process proceeds (e.g., after some predetermined delay) back to 435 and continues to bypass the forwarding element for exchanging packets between the VM and the physical NIC.

The decision for whether or not to perform the optimization of bypassing the forwarding element is taken based on local data available on the particular host that is implementing the optimization. The decision is made based on the ports connected to forwarding element on the particular host and types of features enabled for the connected ports. For instance, the decision to determine how many ports are connected to the forwarding element is based on whether or not a VM on the particular hot is powered on. The VMs that are powered off are considered as not connected to the forwarding element. On the other hand, when a link is down for a PNIC, the PNIC is still considered as connected to the forwarding element. The decision whether port mirroring is enabled is based on whether the port mirroring is enabled for the ports connected to the forwarding element on the particular host. Therefore, even if the forwarding element is an LFE (which is a virtual distributed switch), local information are utilized to determined how many ports of the forwarding element is currently connected in order to make the decision to bypass or use the forwarding element.

B. Bypassing the Forwarding Element in SR-IOV

Single Root input-output (I/O) Virtualization (SR-IOV) is a specification that allows a single Peripheral Component Interconnect Express (PCIe) physical device under a single root port to appear to be multiple separate physical devices to the virtualization software or the guest operating system. SR-IOV uses physical functions (PFs) and virtual functions (VFs) to manage global functions for the SR-IOV devices.

PFs are full PCIe functions that include the SR-IOV extended capability, which is used to configure and manage the SR-IOV functionality. It is possible to configure or control PCIe devices using PFs, and the PF has full ability to move data in and out of the device. VFs are lightweight PCIe functions that contain all the resources necessary for data movement but have a minimized set of configuration resources. SR-IOV enabled PCIe devices present multiple instances of themselves to the guest operating system instance and the host virtualization software.

Figure 5:
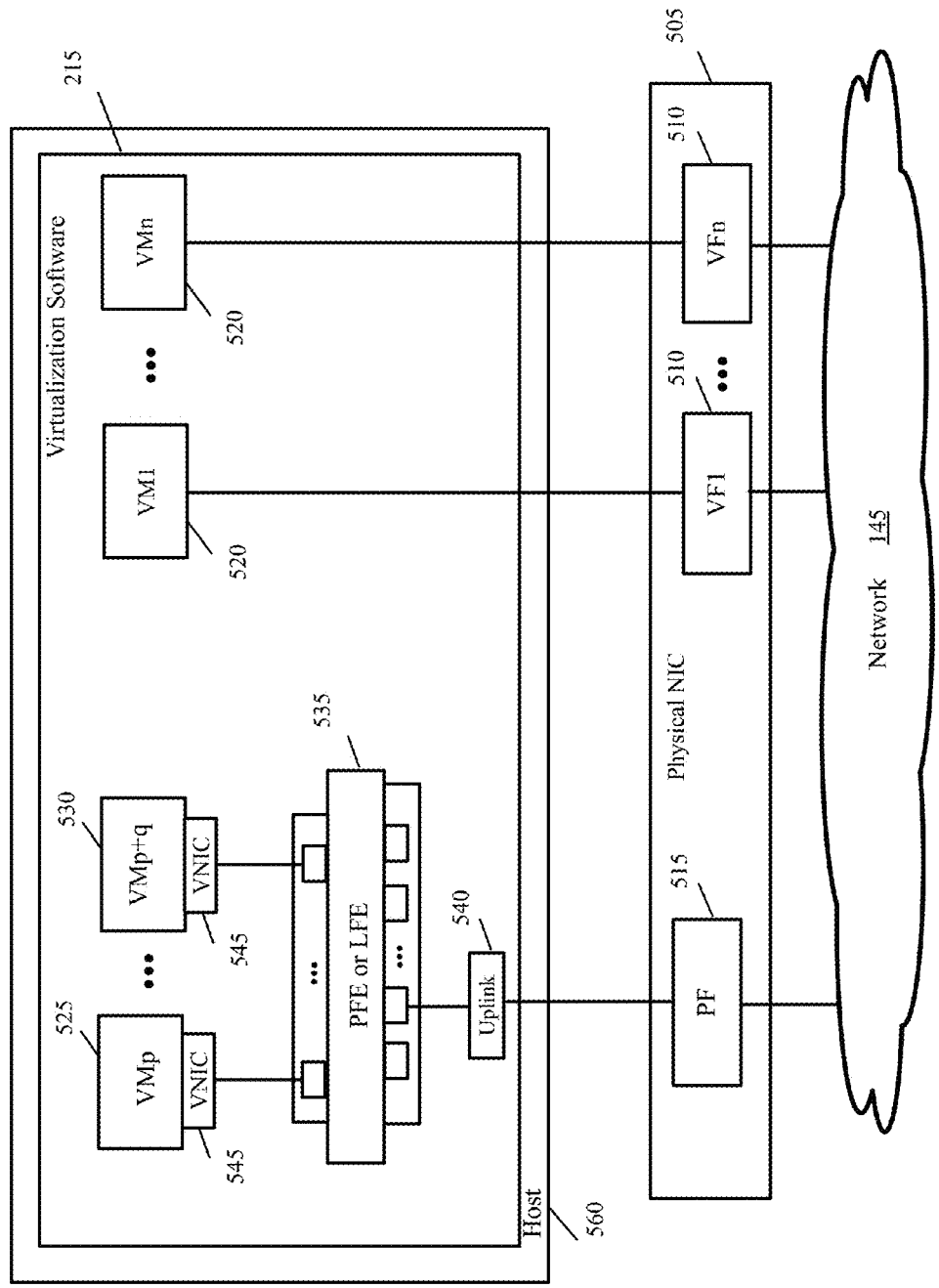
FIG. 5 conceptually illustrates SR-IOV virtualization on a host in some embodiments of the invention.

FIG. 5 conceptually illustrates SR-IOV virtualization on a host in some embodiments of the invention. The VMs of other tenants (if any) are not shown for simplicity. As shown, the SR-IOV capable PNIC 505 includes several VFs 510 and one PF 515. VMs 520 have a direct path to VFs 510. On the other hand, PF 515 is connected to several VMs 525-530 through uplink 540, forwarding element 535, and VNICs 545.

The instantiated VFs 510 can be configured such that they are directly assigned to VMs and the guest operating system's VF driver (not shown) takes possession of the VF. For instance, each VF can create a direct path from a VM to the physical NIC. While such configuration delivers near native network performance to the VM, the data path bypasses the virtualization software/network stack (i.e., the VFs are pass-through devices). Hence such VFs in those VMs are unable to benefit from an overlay network based multi-tenant environment.

However, some or all VMs on a host may not be capable of using an SR-IOV VF in some embodiments. These VMs may need some virtualization features that cannot be provided if the VM bypasses the virtualization software/network stack and is directly connected to a VF. For instance, a VM may require memory overcommit, which is a feature provided by virtualization software that allows a VM to use more memory space than the physical host has available. As an example, on a host with 10 GB of physical memory, the virtualization software may allow 5 VMs, each with 4 GB of allocated memory space to run a host with only 10 GB of physical memory. Some embodiments allow such VMs to still connect to a VF without bypassing the virtualization software stack.

Figure 6:
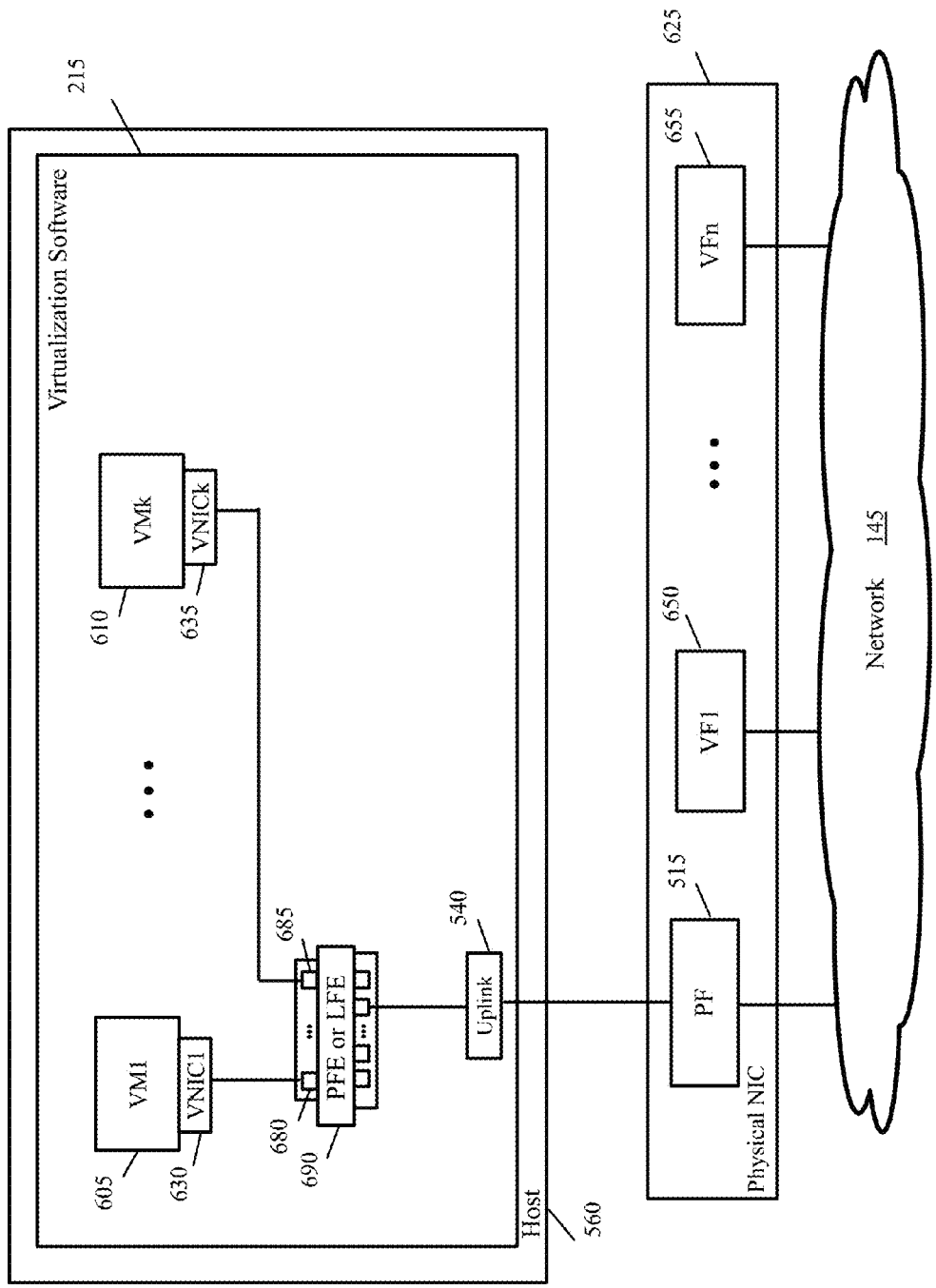
FIG. 6 conceptually illustrates SR-IOV virtualization on a host in some embodiments of the invention where VMs that cannot bypass virtualization software stack are connected to a single SRI-OV enabled PNIC.

FIG. 6 conceptually illustrates SR-IOV virtualization on a host in some embodiments of the invention where VMs that cannot bypass virtualization software stack are connected to a single SRI-OV enabled PNIC. VMs 605-610 are VMs that require the services of software virtualization 215. For instance, the VMs may require memory overcommit. As shown, each of the k VMs 605-610 is associated with one VNIC 630-635. Each VNIC 630-635 is connected to a port 680-685 of a single forwarding element 690. The forwarding element 690 is connected to PF 515 of the PNIC 625 through uplink 540. VMs 605-610 are VMs of one tenant. VMs of other tenants (if any) are on separate logical networks and are not shown.

Some of VFs on PNIC 625 may be utilized by the virtualization software 215 to connect to kernel VNICs, referred to as VMKNICs (not shown). If the PNIC 625 has n available VFs 650-655 and n>=k, then the virtualization software 215 assigns k VFs from the PNIC 625 and treats each of them as a new PNIC. The virtualization software also creates k new forwarding elements and attaches one VNIC and one VF to each forwarding element. The VNICs are also detached from the original FE.

Figure 7:
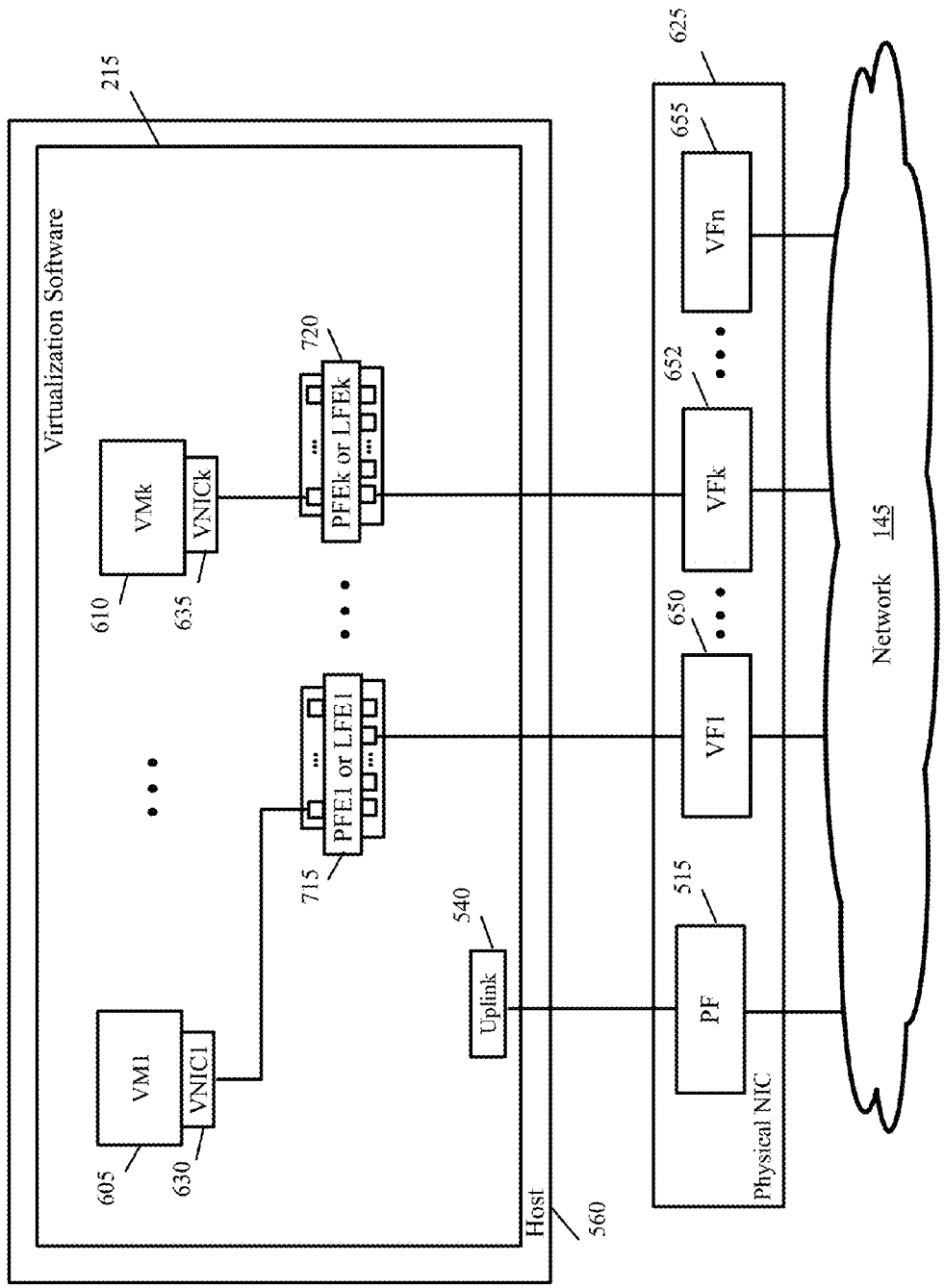
FIG. 7 conceptually illustrates SR-IOV virtualization of FIG. 6 where each VM is connected to a different VF through a separate forwarding element.

FIG. 7 conceptually illustrates SR-IOV virtualization of FIG. 6 where each VM is connected to a different VF through a separate forwarding element. As shown, k VMs 605-610 that were previously (as shown in FIG. 6) connected to a single forwarding element 690 are now connected to k separate forwarding elements 715-720 through their associated VNICs 630-635. Each forwarding element 715-720 is connected to one of the k VFs 650-652 of the RS-IOV enabled PNIC 625. The process of creation of the forwarding elements 715-720, connecting VNICs 630-635 to the forwarding elements, and connecting the forwarding elements to VFs 650-652 is completely transparent to the VNICs and VMs in some embodiments.

Now there is a single uplink and a single VM connected to each of the forwarding elements 715-720 and whenever a set of conditions (as described below) is satisfied, each of the forwarding elements 715-720 can be bypassed. When the set of conditions fails, then all forwarding elements 715-720 are deleted and the VNICs are connected back to the forwarding element 690 (shown in FIG. 6), which frees all VFs 650-652.

Some embodiment, dynamically identify the condition where a forwarding element 715-720 can be bypassed in the connection between a VNICs 630-635 and a VFs 650-652. Since each forwarding element 715-720 is connected to only one of the VNICs 630-635 and one of the VFs 650-652, the forwarding elements satisfy the condition that only two ports to be used on the forwarding element. Another condition for bypassing the forwarding element is that port mirroring is not enabled on the forwarding element.

As another condition, some embodiments determine (as described above by reference to operation 425) whether the port connected to the VNIC has proper security credentials before allowing the bypass. Yet another condition for bypassing a forwarding element is the network virtualization (e.g., tunnels for overlay networks such as VXLAN, GENEVE, NVGRE, and STT) is not performed by the forwarding element. In some embodiments, the forwarding element encapsulates the outgoing packets and decapsulates the incoming packets. In such cases, the forwarding element cannot be bypassed due to the required encapsulation/decapsulation functionality of the forwarding element. In some embodiments, the encapsulation and decapsulation of packets for such tunnels is done outside of a forwarding element.

Therefore, the condition that the forwarding element does not encapsulate and decapsulate packets is satisfied either when the encapsulation and decapsulation of packets is done outside the forwarding element or the forwarding element is capable of encapsulating and decapsulating the packets but such encapsulation and decapsulation is not enabled (e.g., the overlay network tunnels are not used by the VM that is connected to the forwarding element).

Another condition that prevents bypassing of the forwarding elements is when n+1 VMs are powered on and/or moved to the host, i.e., when the number of VMs becomes larger than the number of available VFs on the PNIC. For instance, as a new VM is powered on or a VM is moved (from another host) to the host, the networking layer in the host creates a new forwarding element for the VM and assigns one of the n VFs in the SR-IOV PNIC to the VM. Alternatively, an administrator can enable a previously disabled VNIC to connect the VNIC to one of the VFs through a forwarding element. Eventually, the number of VMs on the host may become larger than the number of available VFs, which prevents bypassing of the forwarding elements.

Figure 8:
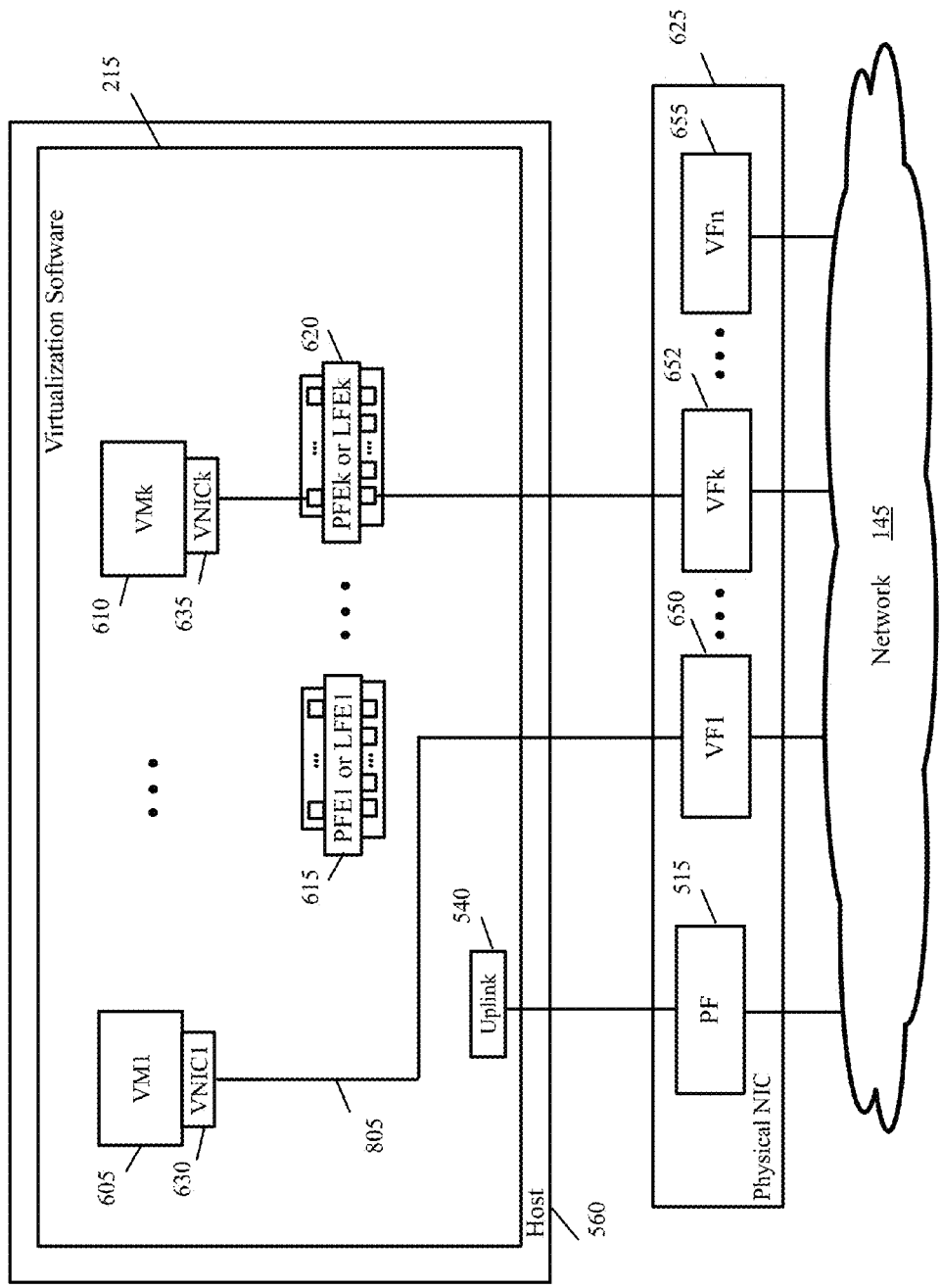
FIG. 8 conceptually illustrates SR-IOV virtualization on a host in some embodiments of the invention where a VM that cannot bypass virtualization software stack bypasses the forwarding element and connects to a VF through a VNIC.

FIG. 8 conceptually illustrates SR-IOV virtualization on a host in some embodiments of the invention where a VM that cannot bypass virtualization software stack bypasses the forwarding element and connects to a VF through a VNIC. As shown, the forwarding element 615 is bypassed for exchanging packets between VM 605 and VF 650. As conceptually shown by line 805, there are no forwarding elements in the path between VNIC 630 and VF 650. The path between the VM 605, VNIC 630, and VF 650, still goes through the virtualization software stack (as opposed to the paths between VMs 520 and VFs 510 in FIG. 5 that bypass the virtualization software stack).

On the other hand, in the example of FIG. 7, the forwarding element 620 does not satisfy all conditions for bypassing (e.g., port mirroring may be enabled on the forwarding element or forwarding element may be used to encapsulate/decapsulate packets for an overlay network). Forwarding element 620, is therefore, not bypassed.

Figure 9:
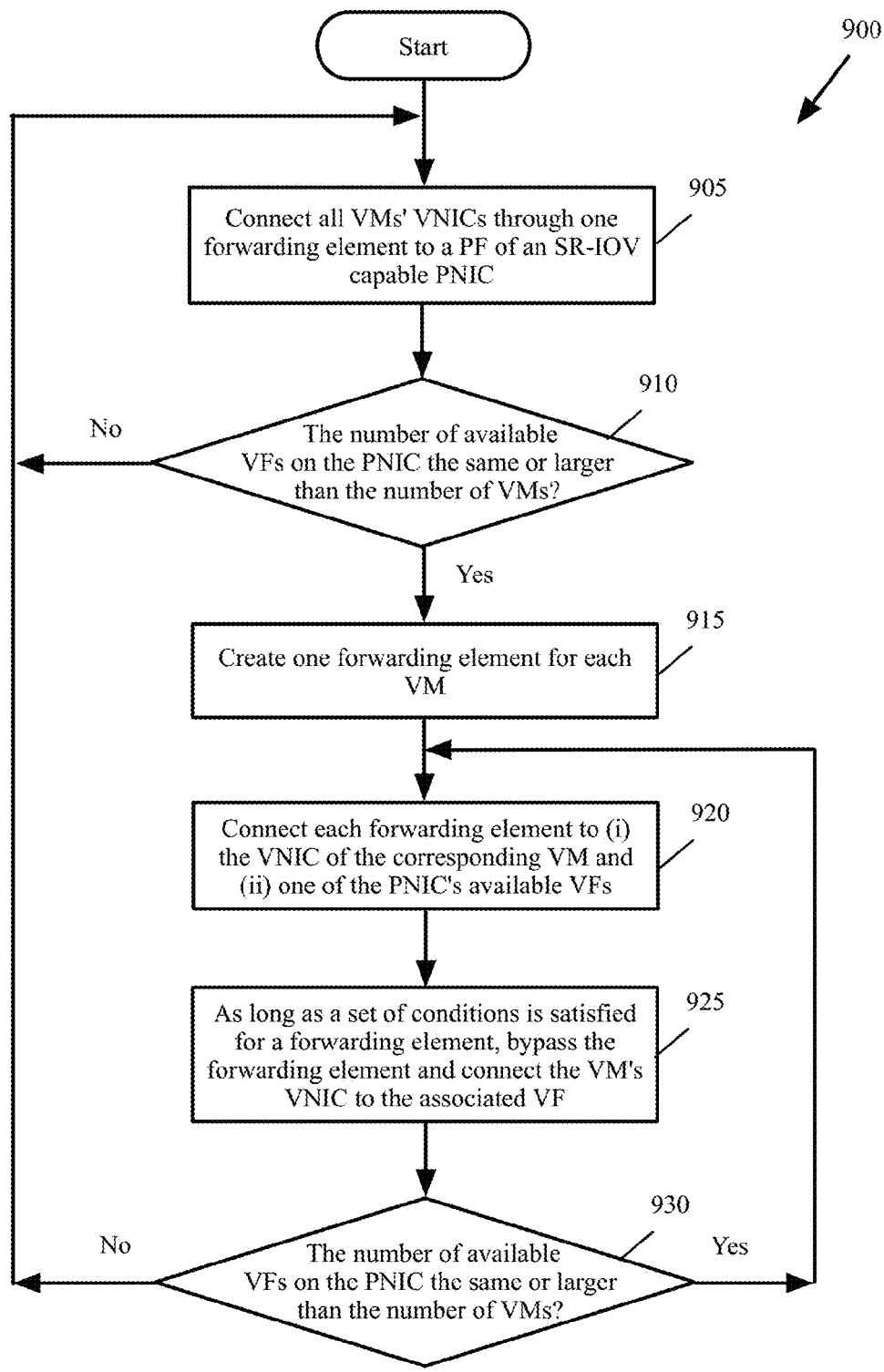
FIG. 9 conceptually illustrates a process for determining whether each VMs on a host can be connected to a VF of an SR-IOV capable PNIC in some embodiments of the invention.

The decision whether or not to bypass a forwarding element to connect a VM and the corresponding VNIC directly to a VF is dynamically made in some embodiments. FIG. 9 conceptually illustrates a process 900 for determining whether each VMs on a host can be connected to a VF of an SR-IOV capable PNIC in some embodiments of the invention. As shown, the process connects (at 905) all VMs' VNICs through a single forwarding element to a PF of an SR-IOV capable PNIC (e.g., as shown in FIG. 6).

The process then determines (at 910) whether the number of available VFs on the PNIC is the same or larger than the number of VMs. If not, the process proceeds (e.g., after a predetermined delay) to 905, which was described above. Otherwise, the process creates (at 915) one forwarding element for each VM. The process then connects (at 920) each forwarding element to (i) the VNIC of the corresponding VM and (ii) one of the PNIC's available VFs (e.g., as shown in FIG. 7)

As long as a set of conditions is satisfied for a forwarding element, the process bypasses (at 925) the forwarding element and connects the VM's VNIC to the associated VF (e.g., as shown in FIG. 8). Details of operation 925 are further described by reference to FIG. 10, below. The process then determines (at 930) whether the number of available VFs on the PNIC is the same or larger than the number of VMs. If not, the process proceeds (e.g., after a predetermined delay) to 905 to connect all VNICs to a single forwarding element. Otherwise, the process proceeds (e.g., after a predetermined delay) to 920, which was described above.

Figure 10:
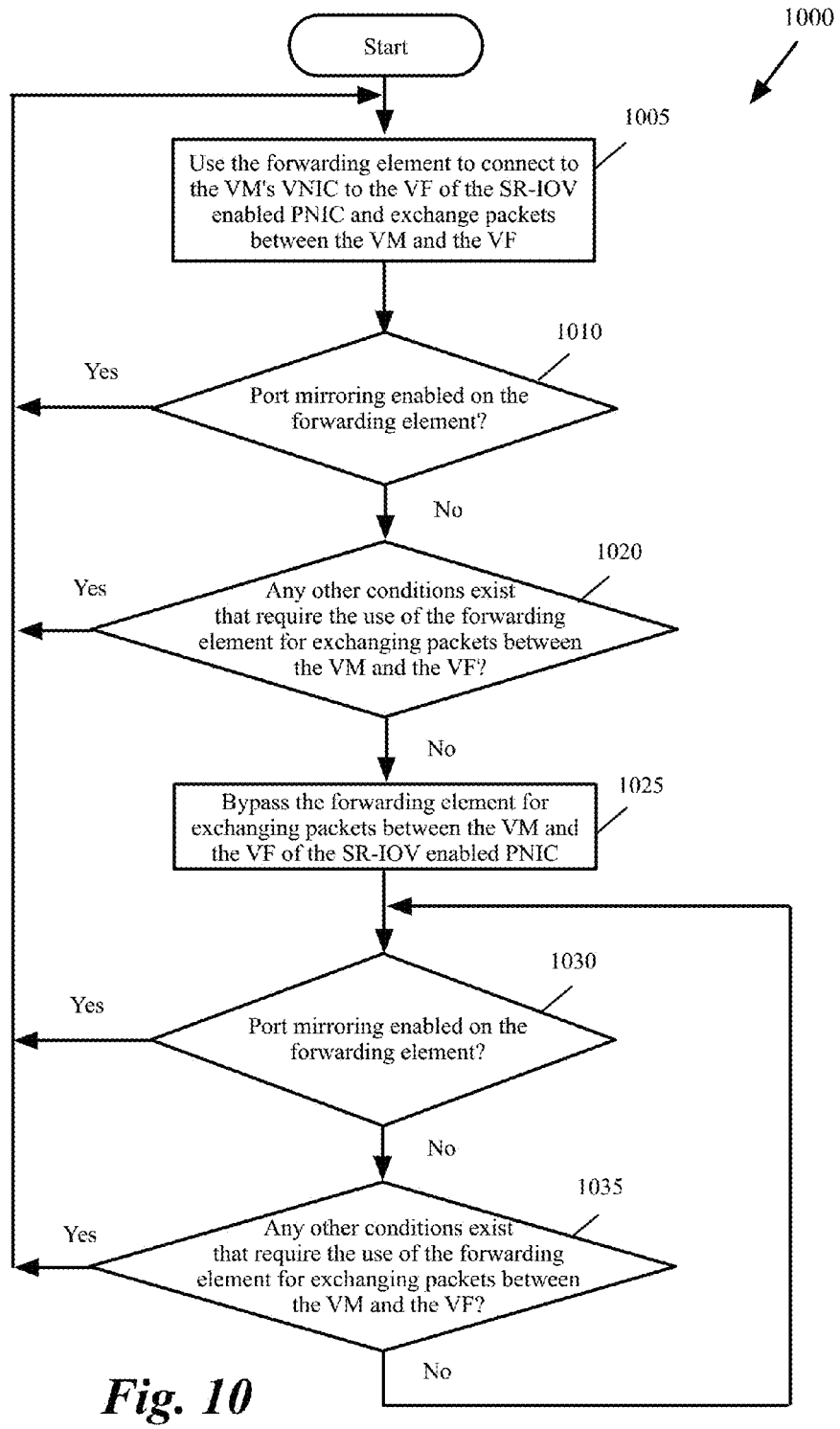
FIG. 10 conceptually illustrates a process for determining whether a forwarding element can be bypassed in the path between a VM and a VF of an SR-IOV enabled PNIC in some embodiments of the invention.

FIG. 10 conceptually illustrates a process 1000 for determining whether a forwarding element can be bypassed in the path between a VM and a VF of an SR-IOV enabled PNIC in some embodiments of the invention. As shown, the process initially uses (at 1005) a forwarding element for exchanging packets between the VM (and the VM's corresponding VNIC) and a VF of an SR-IOV enabled physical NIC. The process then determines (at 1010) whether port mirroring is enabled on the forwarding element. If yes, the process proceeds (e.g., after some predetermined delay) to 805, which was described above. Otherwise, the process determines (at 1020) whether there are any other conditions that require the use of the forwarding element for exchanging packets between the VM and the PNIC. For instance, some embodiments determine whether the port connected to the VM has proper security credentials before allowing the bypass (e.g., whether the port can send arbitrary MAC address packets and can receive arbitrary MAC address packets, i.e., to operate in promiscuous mode).

Another condition for bypassing a forwarding element is the network virtualization is not performed by the forwarding element (as described above by reference to operation 425 in FIG. 4). In other words, the forwarding element is not a part of a software-defined network. If there are any other conditions that require the use of the forwarding element, the process proceeds (e.g., after some predetermined delay) to 1005, which was described above. Otherwise, the process bypasses (at 1025) the forwarding element for exchanging packets between the VM and the VF (e.g., as shown for VM 605 in FIG. 8).

The process then dynamically determines whether the conditions have changed and the forwarding element can no longer be bypassed. The process determines (at 1030) whether port mirroring is enabled on the forwarding element. If yes, the process proceeds back to 1005 to use the forwarding element for exchanging the packets between the VM and the physical NIC. Otherwise, the process determines (at 1035) whether any other conditions (as described above by reference to operation 425) exist that require the use of forwarding element for exchanging packets between the VM and the PNIC. If yes, the process proceeds back to 1005 to use the forwarding element for exchanging the packets between the VM and the physical NIC. Otherwise, the process proceeds (e.g., after some predetermined delay) back to 1030 and continues to bypass the forwarding element for exchanging packets between the VM and the physical NIC.

In some embodiments, VM 605 can have more than one VNIC (not shown). Each of the VM's VNICs can be connected to a separate forwarding element. Similar to the example of FIG. 8, a VM with multiple VNICs can bypass any or all of the forwarding elements connected to it as long as all conditions (as described above) for bypassing the forwarding element are satisfied.

SR-IOV PNICs have built in switches. As long as all VMs are assigned separate VFs, the SR-IOV PNIC can be relied to do the switching. However, this path is more expensive than doing the switching with a forwarding element, but the optimization is more targeted towards packets transiting through the SR-IOV PNIC.

As discussed by reference to FIGS. 3 and 8 above, a forwarding element is dynamically bypassed under certain conditions. Different embodiments provide different mechanisms for bypassing the forwarding element. Some embodiments provide a fast path through the forwarding element software to bypass the functionality of the forwarding element. Other embodiments bypass the forwarding element by providing a direct software link between the uplink and the VNIC driver for the duration that the forwarding element is bypassed.

II. Selective Use of Polling Instead of Interrupt Processing for High Packet Rate Applications Some embodiments identify applications that consistently have high packet rates. These embodiments provide a tradeoff between the processing resources and higher packet rates. These embodiments modify virtual device processing to occur in polling mode rather then interrupt (or sys-call) driven mode. Streamlining virtual device processing provides a two-fold advantage. First, packet processing does not incur any latency. Second, the virtual backend, virtual machine monitor, guest kernel, and guest device driver for the virtual network device do not have to execute interrupt coalescing and interrupt processing code. The processing overhead is reduced by 1%-2%, increasing packet processing by a similar amount. Some embodiments turn on/off the polling mode when a VNIC is initialized (e.g., at the time of VM boot or VNIC reset). In other embodiments, the polling mode is adaptively turned on or off during the runtime. In these embodiments, polling is turned on when packet rate is high and turns off polling when the packet rate is low.

Interrupt coalescing is a technique to hold back events that generate interrupts until a certain amount of time passes or a certain about of data to process is collected. When a VM generates a packet to send out (a transmit packet), the VNIC deriver generates an interrupt (e.g., by performing a call) to the virtualization software to inform the virtualization software of the pending transmit packet. In some embodiments, the VNIC driver implements interrupt coalescing by keeping the transmit packets in a buffer until a predetermined number of transmit packets are received from the VM or a predetermined amount of time since the last interrupt by the VNIC driver to the virtualization software has elapsed. In some embodiments, whichever of these two conditions occur, the VNIC driver interrupts the virtualization software.

Figure 11:
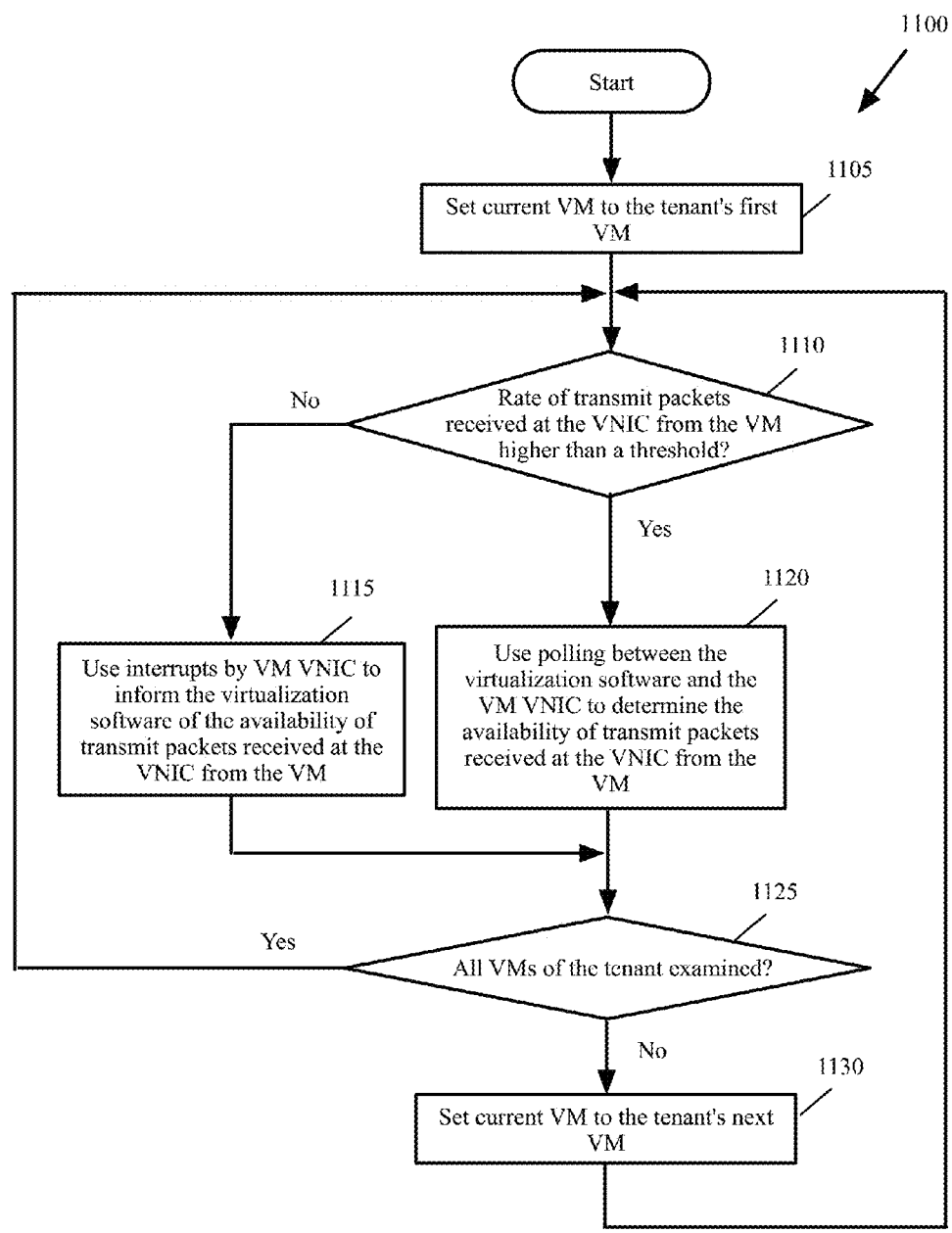
FIG. 11 conceptually illustrates a process for dynamically determining whether to use polling or interrupts to send transmit packets from each of a tenant's VMs to the virtualization software in some embodiments of the invention.

FIG. 11 conceptually illustrates a process 1100 for dynamically determining whether to use polling or interrupts to send transmit packets from each of a tenant's VMs to the virtualization software in some embodiments of the invention. In the following discussions, a transmit packet refers to a packet generated by the VM for transmission to entities outside the VM. As shown, the process sets (at 1105) the current VM to the tenant's first VM.

The process then determines (at 1110) whether the rate of packets received at the VNIC from the VM is higher than a predetermined threshold. If yes, the process determines (at 1120) that polling between the virtualization software and the current VM's VNIC shall be used to indicate the availability of transmit packets received at the VNIC from the VM. The process then proceeds to 1125, which is described below.

Otherwise, the process determines (at 1115) that interrupts shall be used by the VM's VNIC to inform the virtualization software of the availability of transmit packets received at the VNIC from the VM. As described below, some embodiments perform mechanisms such as interrupt coalescing to interrupt the virtualization software. The process then determines (at 1125) whether all VMs of the tenant are examined. If yes, the process proceeds to 1110, which was described above. Otherwise, the process sets (at 1130) the current VM to the tenant's next VM. The process then proceeds to 1110, which was described above.

Figure 12:
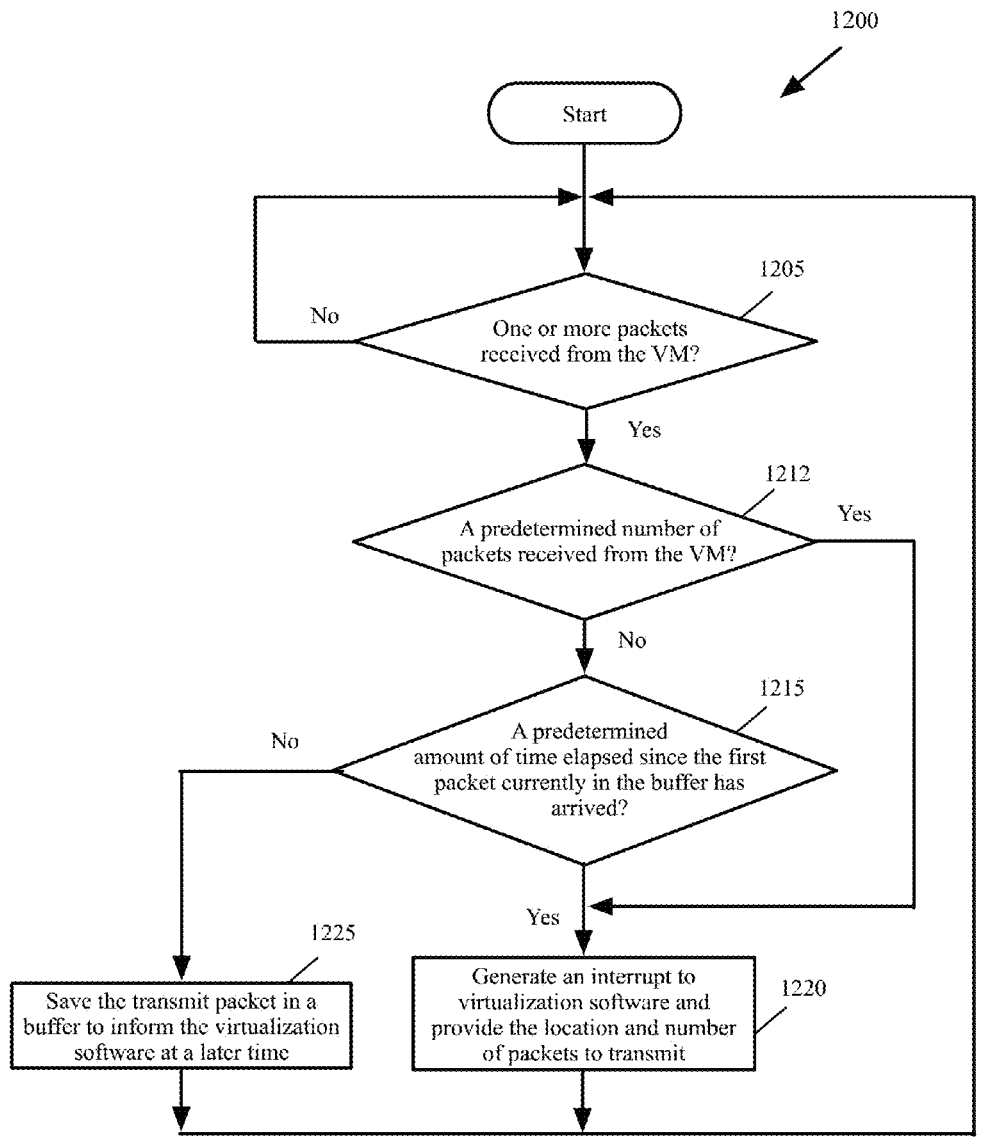
FIG. 12 conceptually illustrates a process for performing interrupt coalescing in some embodiments of the invention.

FIG. 12 conceptually illustrates a process 1200 for performing interrupt coalescing in some embodiments of the invention. As shown, the process determines (at 1205) whether packets are received from the VM. If not, the process returns (e.g., after a predetermined delay) to 1205). Otherwise, the process determines (at 1210) whether a predetermined number of packets is received from the VM. If yes, the process proceeds to 1220, which is described below.

Otherwise, the process determines (at 1215) whether a predetermined amount of time has elapsed since the first packet currently in the buffer has arrived. If no, the process proceeds to 1225, which is described below. Otherwise, the process generates (at 1220) an interrupt to the virtualization software and provides the location and the number of packets that the virtualization software (e.g., the forwarding element of the virtualization software) has to pick up from the buffer to transmit. In some embodiments, the interrupt is generated by a calling mechanism to virtualization software. For instance a hypercall is made from the VNIC driver to the virtualization software to generate a software trap to activate the transmit processing. The process then proceeds to 1205, which was described above. The process saves (at 1225) the transmit packet in a buffer to inform the virtualization software at a later time. The process then proceeds to 1205, which was described above. Generation of an interrupt to virtualization software causes the virtualization software to pick up the packets and reset the number of packets in the buffer to zero.

Figure 13:
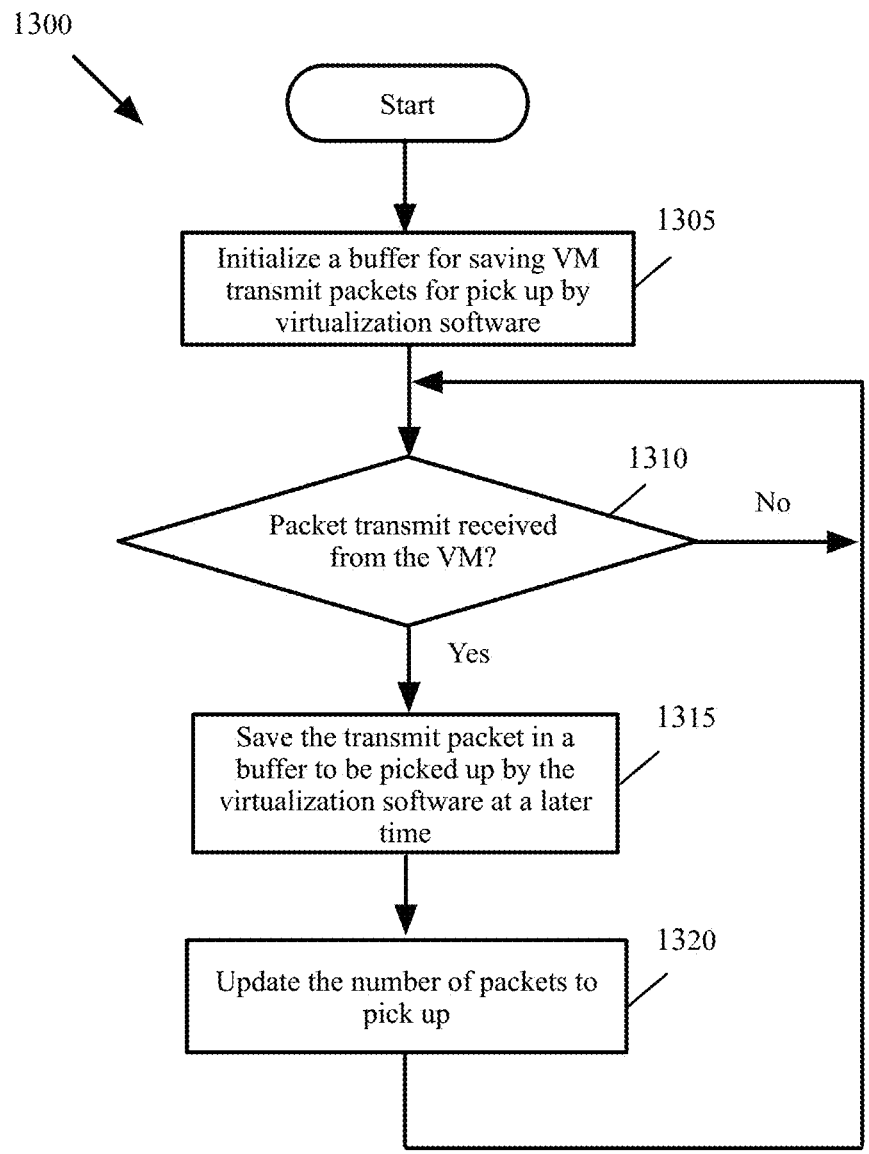
FIG. 13 conceptually illustrates a process performed by the VNIC when the virtualization software performs polling to determine the availability of VM transmit packets in some embodiments of the invention.

FIG. 13 conceptually illustrates a process 1300 performed by the VNIC when the virtualization software performs polling to determine the availability of VM transmit packets in some embodiments of the invention. As shown, the process initializes (at 1305) a buffer for saving VM transmit packets for pick up by the virtualization software.

The process then determines (at 1310) whether a transmit packet is received from the VM. If not, the process proceeds (e.g., after a predetermined time) to 1310. Otherwise, the process saves (at 1315) the transmit packet in a buffer to be picked up by the virtualization software at a later time. The process then updates (at 1320) the number of packets to pick up by the virtualization software. The process then proceeds to 1310, which was described above.

Figure 14:
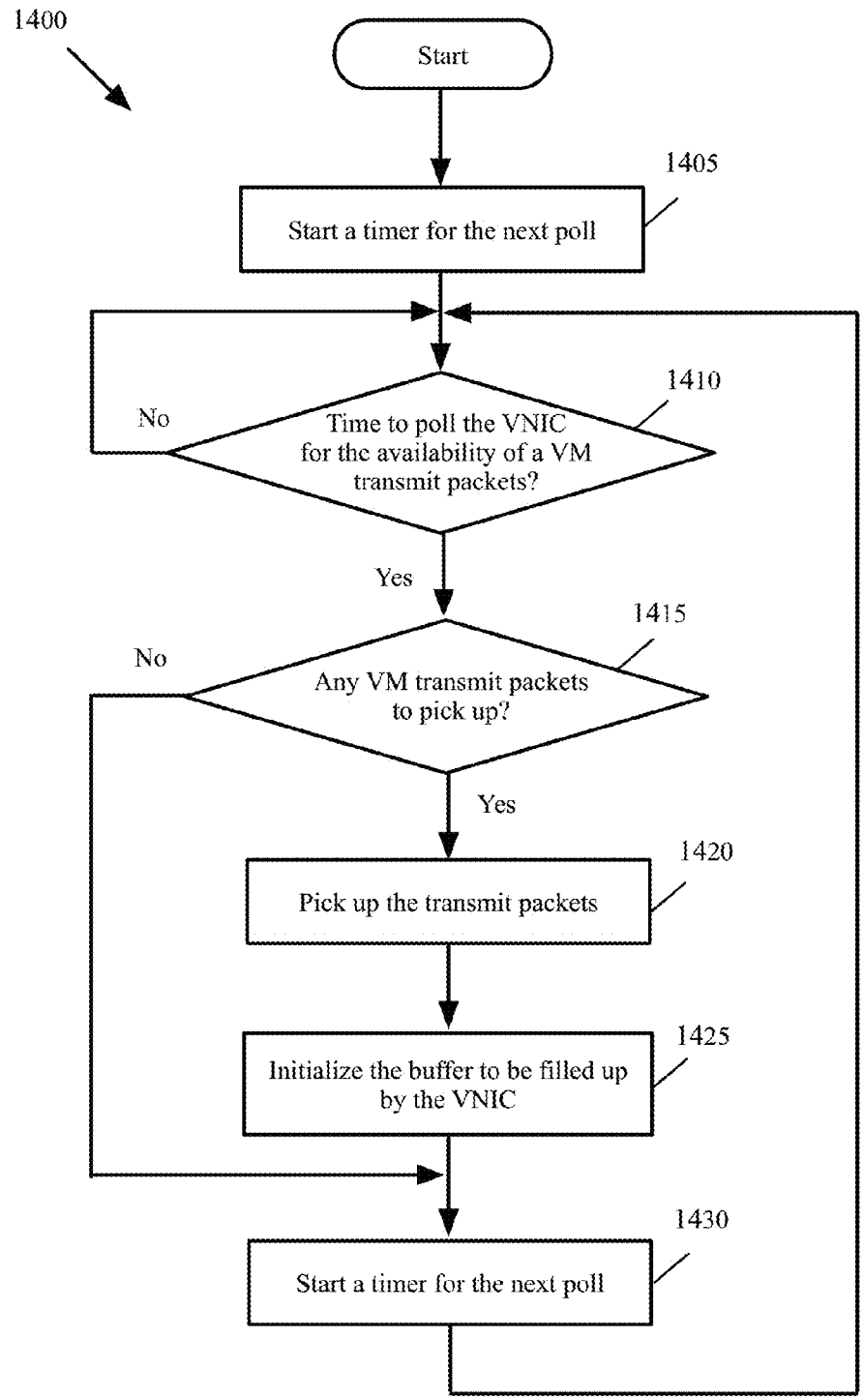
FIG. 14 conceptually illustrates a process performed by the virtualization software in some embodiments to poll a VNIC to determine whether transmit packets are available from the VM.

FIG. 14 conceptually illustrates a process 1400 performed by the virtualization software in some embodiments to poll a VNIC to determine whether transmit packets are available from the VM. As shown, the process starts (at 1405) a timer to perform the next poll. The process then determines (at 1410) whether it is time to poll the VNIC for the availability of a VM transmit packet. For instance, the process determines whether the timer started at 1405 has expired.

If not, the process returns (at after a predetermined time delay) to 1410. Otherwise, the process determines (at 1415) whether any VM transmit packets are available in VNIC buffer to pick up (e.g., as set by process 1300 in operation 1315). If not, the process proceeds to 1430, which is described below.

Otherwise, the process picks up (at 1420) the transmit packets from the buffer. The process then initializes (at 1425) the buffer to be filled up by the VNIC. For instance, the process sets the number of packets in the buffer to zero. The process then starts (at 1430) a timer for performing the next poll. The process then proceeds to 1410, which was described above.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
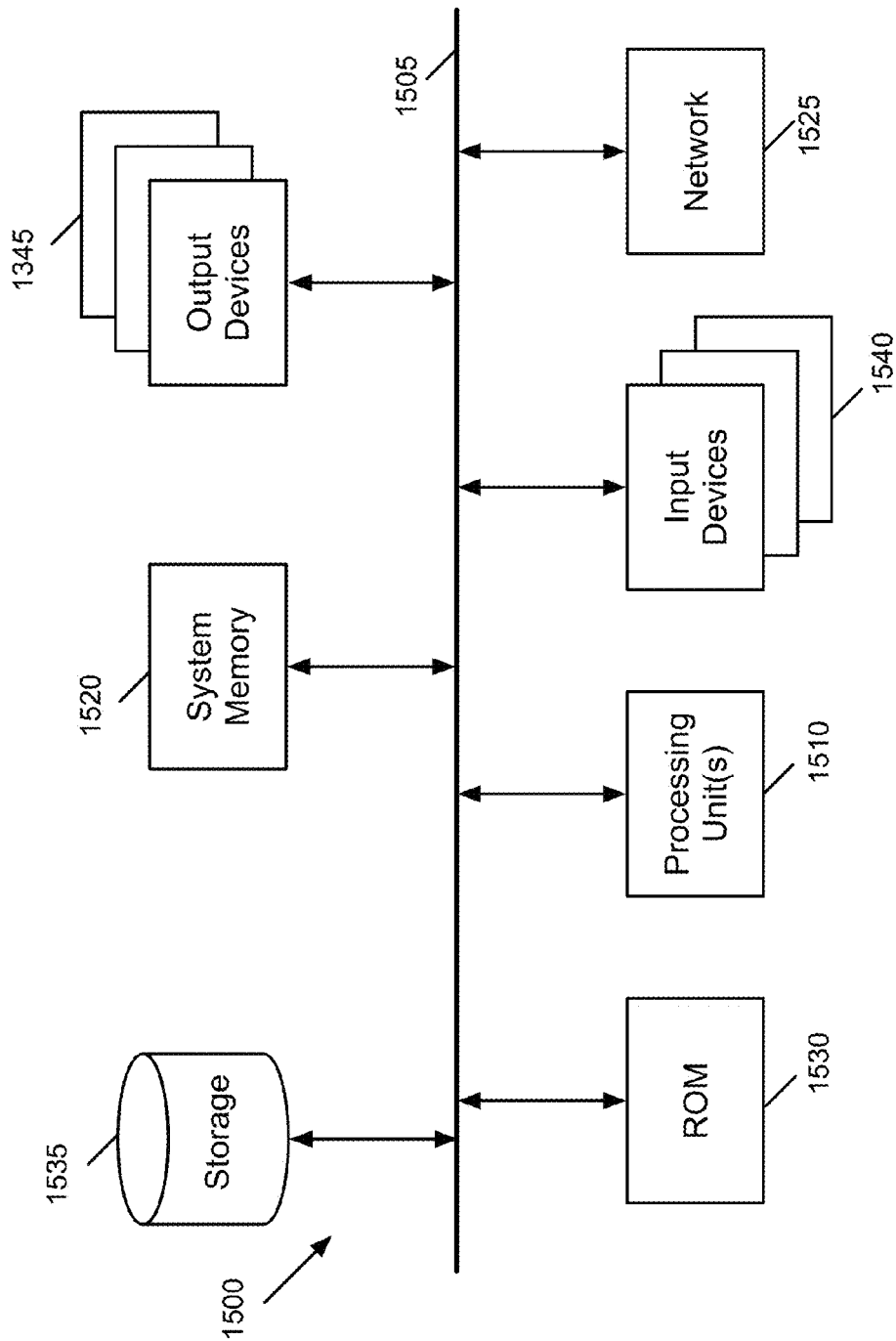
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, compute manager, network manager, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1520, a read-only memory (ROM) 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1520, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1520 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures including FIGS. 4A-4B and 9-14 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of high packet rate network processing in a system comprising a physical host and a set of physical network interface controllers (PNICs), the physical host hosting a set of data compute nodes (DCNs) for each of a set of tenants, each DCN comprising a virtual network interface controller (VNIC) for communicating with one or more PNICs to exchange packets, the method comprising:
   utilizing interrupts to determine an availability of packets received from a particular DCN at a VNIC of the particular DCN;
   receiving a packet from the particular DCN at the VNIC;
   storing the packet in a buffer;
   determining whether a predetermined number of packets have been received at the VNIC from the particular DNC or whether a predetermined amount of time has lapsed since the packet in the buffer was received;
   based on determining the predetermined number of packets have been received at the VNIC from the particular DNC or the predetermined amount of time has lapsed since the packet in the buffer was received, generate an interrupt to the virtualization software; and
   based on determining the predetermined number of packets have not been received at the VNIC from the particular DNC or whether the predetermined amount of time has not lapsed since the packet in the buffer was received:
      determining a rate of packets received from the particular DCN at the VNIC; and
         based on determining that the rate of packets exceeds the predetermined threshold, performing polling to determine the availability of packets received at the VNIC from the particular DCN while the rate of packets received from the particular DCN at the VNIC is exceeding the threshold; and based on determining that the rate of packets does not exceed the predetermined threshold, maintaining utilizing interrupts to determine the availability of packets received at the VNIC from the particular DCN.

2. The method of claim 1, wherein the physical host comprises virtualization software, wherein performing polling to determine the availability of packets received at the VNIC from the particular DCN comprises:
   determining by the VNIC that the packet is received from the particular DCN;
   storing the packet in a buffer for the virtualization software to pick up; and
   updating a number of packets in the buffer.

3. The method of claim 2, wherein performing polling further comprises:
   determining by the virtualization software that the VNIC has to be polled; and
   determining whether the VNIC has stored any packets in the buffer.

4. The method of claim 3 further comprising:
   picking up the packets from the buffer by the virtualization software; and
   setting the number of packets in the buffer to zero.

5. The method of claim 4 further comprising starting a timer by the virtualization software to perform a next poll to determine the availability of packets received from the particular DCN at the VNIC.

6. The method of claim 1, wherein the physical host comprises virtualization software, wherein utilizing interrupts to determine the availability of packets received at the VNIC from the particular DCN comprises
   generating an interrupt to the virtualization software to inform the virtualization software that packets have arrived from the particular DCN when the predetermined number of packets have arrived at the VNIC from the particular DCN.

7. The method of claim 1, wherein the physical host comprises virtualization software, wherein utilizing interrupts to determine the availability of packets received at the VNIC from the particular DCN comprises
   generating an interrupt to the virtualization software to inform the virtualization software that packets have arrived from the particular DCN when the predetermined number of packets have arrived at the VNIC from the particular DCN.

8. A non-transitory machine readable medium storing a program for of high packet rate network processing in a system comprising a physical host and a set of physical network interface controllers (PNICs), the physical host hosting a set of data compute nodes (DCNs) for each of a set of tenants, each DCN comprising a virtual network interface controller (VNIC) for communicating with one or more PNICs to exchange packets, the program executable by at least one processing unit, the program comprising sets of instructions for:
   utilizing interrupts to determine an availability of packets received from a particular DCN at a VNIC of the particular DCN;
   receiving a packet from the particular DCN at the VNIC;
   storing the packet in a buffer;
   determining whether a predetermined number of packets have been received at the VNIC from the particular DNC or whether a predetermined amount of time has lapsed since the packet in the buffer was received;
   based on determining the predetermined number of packets have been received at the VNIC from the particular DNC or the predetermined amount of time has lapsed since the packet in the buffer was received, generate an interrupt to the virtualization software; and
   based on determining the predetermined number of packets have not been received at the VNIC from the particular DNC or whether the predetermined amount of time has not lapsed since the packet in the buffer was received:
      determining a rate of packets received from the particular DCN at the VNIC; and
         based on determining that the rate of packets exceeds the predetermined threshold, performing polling to determine the availability of packets received at the VNIC from the particular DCN while the rate of packets received from the particular DCN at the VNIC is exceeding the threshold; and
         based on determining that the rate of packets does not exceed the predetermined threshold, maintaining utilizing interrupts to determine the availability of packets received at the VNIC from the particular DCN.

9. The non-transitory machine readable medium of claim 8, wherein the physical host comprises virtualization software, wherein the set of instructions for performing polling to determine the availability of packets received at the VNIC from the particular DCN comprises sets of instructions for:
   determining by the VNIC that the packet is received from the particular DCN;
   storing the packet in the buffer for the virtualization software to pick up; and
   updating a number of packets in the buffer.

10. The non-transitory machine readable medium of claim 9, wherein the set of instructions for performing polling further comprises sets of instructions for:
   determining by the virtualization software that the VNIC has to be polled; and
   determining whether the VNIC has stored any packets in the buffer.

11. The non-transitory machine readable medium of claim 10, the program further comprising sets of instructions for:
   picking up the packets from the buffer by the virtualization software; and
   setting the number of packets in the buffer to zero.

12. The non-transitory machine readable medium of claim 11, the program further comprising a set of instructions for starting a timer by the virtualization software to perform a next poll to determine the availability of packets received from the particular DCN at the VNIC.

13. The non-transitory machine readable medium of claim 8, wherein the physical host comprises virtualization software, wherein the set of instructions for utilizing interrupts to determine the availability of packets received at the VNIC from the particular DCN comprises sets of instructions for
   generating an interrupt to the virtualization software to inform the virtualization software that packets have arrived from the particular DCN when the predetermined number of packets have arrived at the VNIC from the particular DCN.

14. The non-transitory machine readable medium of claim 8, wherein the physical host comprises virtualization software, wherein the set of instructions for utilizing interrupts to determine the availability of packets received at the VNIC from the particular DCN comprises sets of instructions for
   generating an interrupt to the virtualization software to inform the virtualization software that packets have arrived from the particular DCN when the predetermined number of packets have arrived at the VNIC from the particular DCN.

15. A physical computing device comprising:
a set of processing units; and a non-transitory machine readable medium storing a program for execution by the set of processing units, the physical computing device hosting a set of data compute nodes (DCNs) for each of a set of tenants, each DCN comprising a virtual network interface controller (VNIC) for communicating with one or more PNICs to exchange packets, the sets of instructions for:
utilizing interrupts to determine an availability of packets received from a particular DCN at a VNIC of the particular DCN;
receiving a packet from the particular DCN at the VNIC;
storing the packet in a buffer;
determining whether a predetermined number of packets have been received at the VNIC from the particular DNC or whether a predetermined amount of time has lapsed since the packet in the buffer was received;
based on determining the predetermined number of packets have been received at the VNIC from the particular DNC or the predetermined amount of time has lapsed since the packet in the buffer was received, generate an interrupt to the virtualization software; and
based on determining the predetermined number of packets have not been received at the VNIC from the particular DNC or whether the predetermined amount of time has not lapsed since the packet in the buffer was received:
determining a rate of packets received from the particular DCN at the VNIC; and
based on determining that the rate of packets exceeds the predetermined threshold, performing polling to determine the availability of packets received at the VNIC from the particular DCN while the rate of packets received from the particular DCN at the VNIC is exceeding the threshold; and
based on determining that the rate of packets does not exceed the predetermined threshold, maintaining utilizing interrupts to determine the availability of packets received at the VNIC from the particular DCN.

16. The physical computing device of claim 15, wherein the physical host comprises virtualization software, wherein the set of instructions for performing polling to determine the availability of packets received at the VNIC from the particular DCN comprises sets of instructions for:
determining by the VNIC that the packet is received from the particular DCN;
storing the packet in the buffer for the virtualization software to pick up; and
updating a number of packets in the buffer.

17. The physical computing device of claim 16, wherein the set of instructions for performing polling further comprises sets of instructions for:
determining by the virtualization software that the VNIC has to be polled; and
determining whether the VNIC has stored any packets in the buffer.

18. The physical computing device of claim 17, the program further comprising sets of instructions for:
picking up the packets from the buffer by the virtualization software; and
setting the number of packets in the buffer to zero.

19. The physical computing device of claim 18, the program further comprising a set of instructions for starting a timer by the virtualization software to perform a next poll to determine the availability of packets received from the particular DCN at the VNIC.

20. The physical computing device of claim 15, wherein the physical host comprises virtualization software, wherein the set of instructions for utilizing interrupts to determine the availability of packets received at the VNIC from the particular DCN comprises sets of instructions for
generating an interrupt to the virtualization software to inform the virtualization software that packets have arrived from the particular DCN when the predetermined number of packets have arrived at the VNIC from the particular DCN.

21. The physical computing device of claim 15, wherein the physical host comprises virtualization software, wherein the set of instructions for utilizing interrupts to determine the availability of packets received at the VNIC from the particular DCN comprises sets of instructions for
generating an interrupt to the virtualization software to inform the virtualization software that packets have arrived from the particular DCN when the predetermined number of packets have arrived at the VNIC from the particular DCN.

* * * * *